Jan. 17, 1961  J. P. CREIGHTON  2,968,287
HYDROSTATIC TRANSMISSIONS
Filed April 20, 1959  2 Sheets-Sheet 1

Inventor
J. P. Creighton
By Glascock Downing Seebold
Attys.

Jan. 17, 1961 J. P. CREIGHTON 2,968,287
HYDROSTATIC TRANSMISSIONS
Filed April 20, 1959 2 Sheets-Sheet 2

Inventor
J. P. Creighton

United States Patent Office 2,968,287
Patented Jan. 17, 1961

2,968,287
HYDROSTATIC TRANSMISSIONS

John Purcell Creighton, Castle Bromwich, near Birmingham, England, assignor to Ford Motor Company Limited, London, England Filed Apr. 20, 1959, Ser. No. 807,668

Claims priority, application Great Britain Apr. 25, 1958

4 Claims. (Cl. 121—120)

This invention relates to hydrostatic transmissions of the type wherein a pump supplies fluid to one or more motors each motor being multicylinder and of the radial piston type either rotating about or causing to rotate an output shaft by reaction of the piston loads on an eccentric cam on the output shaft through the medium of a bearing interposed between said piston and cam.

It is usual for one type of said bearing to be a slipper in close and slidable contact on one side with an arcuate face at the base of the piston and on its opposite side with the profile face of the eccentric cam. When space limitations are unimportant said slipper can be sufficiently large to provide a load bearing capacity over the area of face contact with said piston and cam wall in excess of the loads imposed by the transmission operating fluid pressure acting upon the crown of each piston so that the unit loading at the contact faces of said slipper and insufficient to destroy the lubricating fluid film at said faces and premature breakdown or seizure does not occur thus resulting in a long working life and high mechanical efficiency.

When space limitations are important such as in vehicles and other restricted applications motors are necessarily small and when their power requirements are large must be operated at very high pressures. The loadings on the faces of slippers in such smaller motors are also very large to an extent that in extreme cases of high operating pressures the lubricating fluid films at said slipper face are destroyed causing metal-to-metal contact of these faces resulting in high friction, increase of temperature, low mechanical efficiency and rapid failure.

An object of this invention therefore is to provide a slipper designed to be produced at low cost and to which a supply of lubricating fluid is separately pumped at pressures higher than that of the transmission operating fluid so as to maintain a lubricating fluid film at the faces of the said slipper whatever the magnitude of the loadings imposed upon, and thereby preventing said metallic contact at said faces to reduce friction, increase mechanical efficiency and promote a high durability factor.

A further object is to provide a simple and cheaply produced pump within the confines of each cylinder for the supply of said lubricating fluid at the desired high pressure for the purpose intended and for the pumping of said lubricating fluid to occur only when the load is imposed on the said slipper faces, i.e. synchronised with the reciprocating movement of the piston so that said pumping occurs during the power stroke of the piston.

A still further object is to provide lubricating fluid at pressure proportionate to the transmission fluid operating pressure so that the fluid film thickness at the slipper faces remains substantially as desired regardless of pressure changes of the transmission operating fluid.

The desired quantity of lubricating fluid to be pumped to obtain efficient lubrication of said slipper faces is determined from the well known formula:

$$Q = \frac{\Delta P \cdot b \cdot h^3}{12 u l}$$

where $Q$=flow in cubic inches per second.
$\Delta P$=pressure difference resulting from flow, lbs. per sq. in.
$b$=width of path of flow in inches.
$l$=length of path of flow in inches.
$h$=desired thickness of fluid film in inches.
$u$=absolute viscosity of fluid in reyns, lb.-second per sq. in.

By using this invention it is possible to provide high power motors of small size which thus enables the cost of producing motors of this type to be reduced.

Other advantages will be readily seen from the description of one embodiment of the invention and of an alternative pumping means to which the accompanying drawings refer:

Figure 1:
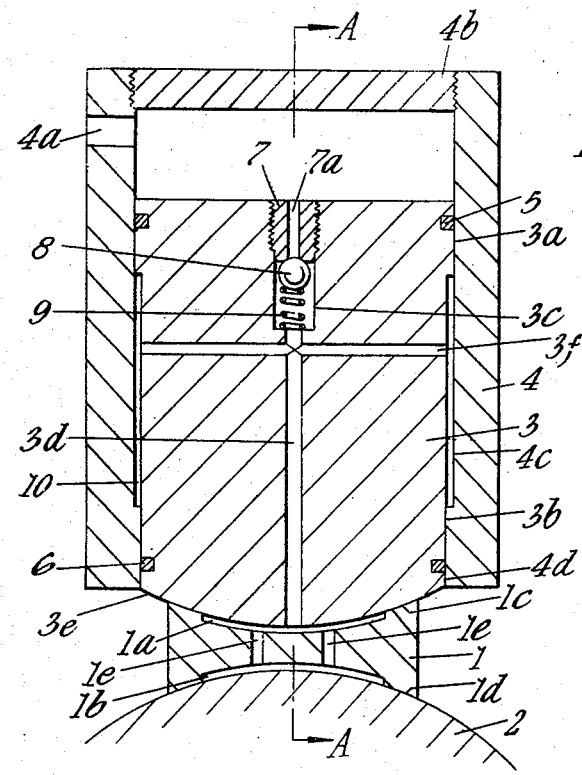
Figure 1 is a vertical section of a piston-slipper-cam arrangement incorporating one form of pumping means.

Referring to Figure 1, a slipper bearing 1 is interposed between an eccentric cam 2 on an output shaft (not shown) and a piston 3 which is free to slide in the bore of cylinder 4 provided with a port 4a through which transmission operating fluid is passed to and from the cylinder 4. An end cover 4b is fitted, in this example, by screw means to the said cylinder for ease of assembly of piston 3 and for sealing that end of the cylinder bore.

Piston 3 has a major outside diameter 3a at the upper end and closely sliding in a major diameter 4c of the cylinder bore and a minor outside diameter 3b at its lower end closely sliding in a minor diameter 4d of the cylinder bore. Piston rings of conventional design for high pressure sealing of hydraulic fluids are shown at 5 and 6.

At or near the diametrical centre of the piston 3 a chamber 3c is provided to receive a plug 7 a ball 8 and a spring 9 to form a non-return valve, the ball 8 being spring-loaded on to a seating formed by the end of a throughbore 7a on the axial centre of plug 7. The base of the piston 3 is in the form of an arcuate surface 3e to receive the incurved form of one of the faces of slipper 1 on which it is free to slide. A small diameter passage 3d connects the centre of said arcuate face 3e with the end of chamber 3c.

A cross passage 3f connects the said passage 3d to the minor outside diameter 3b of said piston where a pumping chamber 10 is formed by the differential diameters 3a and 3b of piston 3 in their positional contact with the bore diameters 4c and 4d of cylinder 4 sealed at each end by piston rings 5 and 6.

Figure 2:
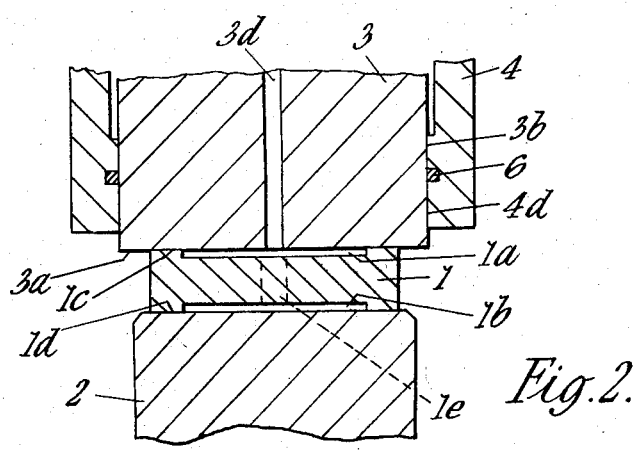
Figure 2 is part of a section on the line A—A of Figure 1.
Figure 3:
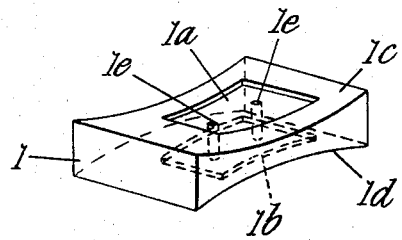
Figure 3 is a perspective view of a slipper.

Referring to Figures 1, 2 and 3, slipper 1 has a recessed portion 1a centrally located in one incurved face so that a land 1c is formed surrounding said recess for contact with the arcuate face 3e of piston 3 and a similar recess 1b is formed in the opposite face of said slipper to provide a similar land 1d for contact with the profile of eccentric cam 2. Holes 1e connect the two recesses 1a and 1b for transfer of lubricating fluid.

Having described one particular construction of a pumping means we now describe an alternative design in which the pumping means is wholly contained within the piston for the purpose intended.

Figure 4:
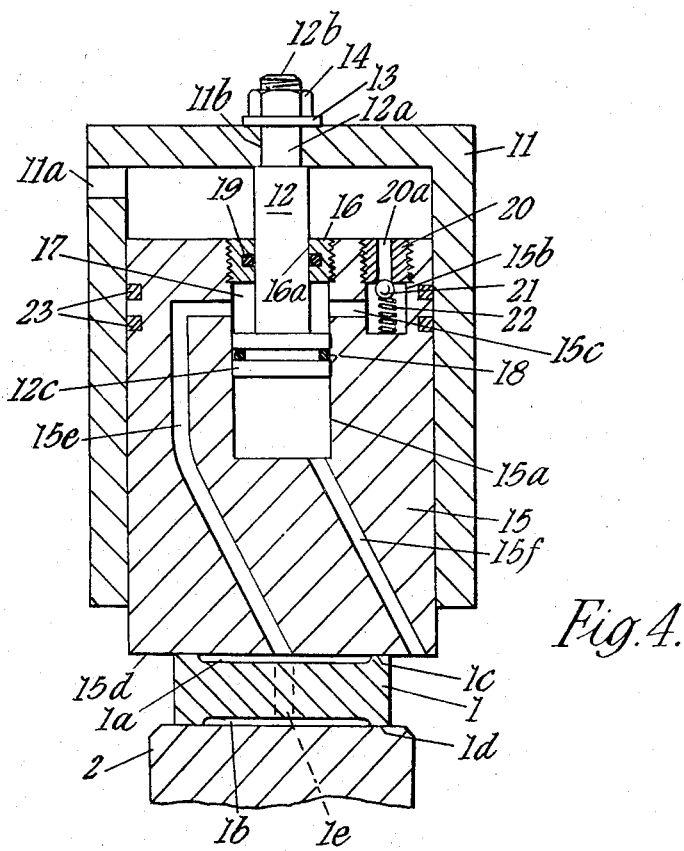
Figure 4 is a vertical section corresponding to Figure 2 of an embodiment having an alternative pumping means.

Referring to Figure 4 cylinder 11 is provided with a blind ended bore and port 11a through which transmission operating fluid is passed to and from the said cylinder bore. Attached to the diametrical centre of the wall at the blind of said bore is a piston rod which has a small diameter 12a closely fitting into a hole 11b in the said wall and extending beyond this wall in the form of a screwed end 12b to receive a washer 13 and a nut 14 for retaining said piston rod to the said wall. At the other end of said piston rod is an enlarged diameter 12c which forms a piston.

In the bore of cylinder 11 is a piston 15 closely and slidably located in the crown of which is provided a blind ended bore 15a in which piston 12c is also closely and slidably located the open end of said bore 15a being fitted with a plug 16 provided with an axially central throughbore 16a through which the piston rod 12 closely and slidably passes. Thus a pump chamber 17 is formed between one end face of piston 12c and the inner end face of plug 16 said pumping chamber being sealed at its ends by a conventional high pressure seal ring 18 fitted into a groove in said piston 12c and a similar type of ring 19 in a groove in the bore of said plug.

Also provided in the crown of piston 15 is a chamber 15b to receive a plug 20 a ball 21 and a spring 22 to form a non-return valve the ball 21 being springloaded on to a seating formed by the end of a throughbore 20a on the axial centre of plug 20. A passage 15c connects bore 15b with the pump chamber 17.

The other end of piston 15 is provided with a face 15d for close and slidable contact with face 1c of slipper 1 and the centre of said face is connected to pump chamber 17 by a further passage 15e. A drain passage 15f is also provided to connect the blind end of bore 15a to the arcuate face 15d but at a position outside the contact area of the slipper 1 on said arcuate face so that it leads directly to the sump of the motor.

Conventional seal rings 23 are provided in annular grooves in the outside diameter, and near the crown, of piston 15.

Having described one embodiment of the invention together with alternative constructions of pumping means we now describe the operations by which the said slipper faces are effectively lubricated. For the purpose of this description the reference numbers which apply to the alternative construction of pumping means are given in parenthesis.

The outward stroke of piston 3(15) caused by the continued rotation of the eccentric cam 2 as a result of operating loads imposed by other similar pistons during their power strokes in a multi-cylinder radial piston motor causes the transmission operating fluid contained within cylinder 4(11) to be forced through port 4a(11a) into the return flow line to the transmission pump, thereby causing the said fluid to be raised in pressure to the extent of the limit determined by the setting of a low pressure relief valve normally incorporated in such transmissions, said pressure being sufficient to overcome the light spring load exerted by spring 9(22) on ball 8(21) so as to lift said ball off its seating to allow a quantity of said fluid to be forced into the pump chamber 10(17) by way of throughbore 7a(20a) in plug 7(20) chamber 3c(15b) passages 3d, 3f(15c) and said fluid continues to be forced to said pumping chamber until said outward stroke of piston 3(15) is completed when the said pumping chamber is then completely filled.

Transmission operating fluid is then forced by the transmission pump into the cylinder 4(11) by way of port 4a(11a) and imposes a load upon the crown of piston 3(15) so as to cause said piston to move inwardly and thereby commence its power stroke during which the pump chamber volume is progressively reduced and the fluid contained therein is thereby forced by way of passage 3d(15e) to the arcuate face 3e(15d) of said piston from whence it passes into the recesses in the slipper faces directly into recess 1a and through holes 1e to recess 1b. From these recesses said fluid is forced in sufficient quantity across the lands 1c and 1d at the slipper faces at a pressure which not only counterbalances the load imparted to the piston crown by the transmission operating fluid but also causes said faces to be separated from arcuate face of piston and also from the profile face of eccentric cam 2 sufficiently to provide for the passage of a lubricating fluid film of predetermined thickness.

To those skilled in the art other forms of pumping means could be devised for the purpose intended.

I claim:

1. In a hydrostatic transmission of the type described the combination of an hydraulic cylinder, a piston operating in the cylinder and having an arcuate end face and an interior passage leading thereto, an eccentric cam, a slipper in slidable contact on one face with the eccentric cam and on the other face with the arcuate end face of the piston and having interconnected recessed portions on said two faces, means mounted in the piston for introducing hydraulic fluid into the interior passage of the piston during one stroke thereof in the cylinder and co-operating means on the piston and cylinder for forcing the thus introduced fluid into the recessed portions of the slipper on the reverse stroke of the piston in the cylinder.

2. The combination as claimed in claim 1, in which said means for introducing hydraulic fluid into the interior passage of the piston comprises a one-way valve.

3. The combination as claimed in claim 1 in which said co-operating means comprise a stepped construction of the piston and of the cylinder walls co-operating therewith forming a recess in between which is connected the interior passage of the piston.

4. The combination as claimed in claim 1 in which said co-operating means comprise a cylindrical recess in the crown of the piston connected with the interior passage in the piston and a second piston fixed with respect to the hydraulic cylinder and operating in the cylindrical recess as the first piston reciprocates.

No references cited.